3,020,274
6-AMINO-9-D-PSICOFURANOSYLPURINE
Thomas E. Eble and Charles Lewis, Kalamazoo, Mich., assignors to The Upjohn Company, Kalamazoo, Mich., a corporation of Michigan
No Drawing. Filed Mar. 10, 1958, Ser. No. 720,066
3 Claims. (Cl. 260—211.5)

This invention relates to a new chemical compound, more particularly to 6-amino-9-D-psicofuranosylpurine having the structural formula:

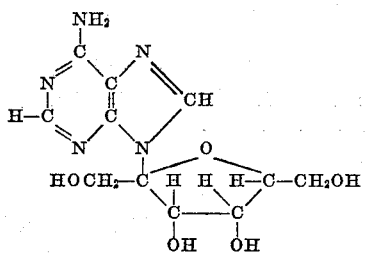

and an optical rotation, $[\alpha]_D^{25}$, in dimethylformamide of minus 68 degrees. The novel compound of the invention is biologically active as an antibiotic, particularly against *Streptococcus hemolyticus* and *Staphylococcus aureus* in vivo, and is useful for treating infections caused by these organisms. Its effectiveness in human therapy, however, has not been established. The compound is also a source of the heretofore difficultly obtainable sugar, psicose, which is readily obtainable by hydrolysis of 6-amino-9-D-psicofuranosylpurine with dilute sulfuric acid.

6-amino-9-D-psicofuranosylpurine can be produced as an elaboration product of a Streptomyces sp., probably a variant of *Streptomyces hygroscopicus* now named *Streptomyces hygroscopicus*, var. *decoyicus*, which has been deposited with the Northern Regional Research Laboratory, and designated as NRRL 2666. This microorganism is similar to 6A–704 as used by H. Yüntsen et al. (Japan Journal of Antibiotics, Series A, vol. VII, No. 4, August 1954, pages 113 and 116; and Japan Journal of Antibiotics, Series A, December 1956, page 195) to produce angustmycin A, B, and C. Of these, angustmycin C appears similar to, but is different from 6-amino-9-D-psicofuranosylpurine in that angustmycin C is optically inactive whereas 6-amino-9-D-psicofuranosylpurine is optically active. Also angustmycin C was reported as being biologically inactive whereas 6-amino-9-D-psicofuranosylpurine is biologically active.

The invention can be more fully understood by reference to the following example, which is given by way of illustration only and is not to be construed as to be limiting.

Example 1

*Streptomyces hygroscopicus* var. *decoyicus*, NRRL 2666, was cultured at 28 degrees centigrade on sterile slants of the following medium:

| | Grams |
|---|---|
| Maltose | 10 |
| Tryptone | 5 |
| Dipotassium hydrogen phosphate | 0.5 |
| Sodium chloride | 0.5 |
| Hydrated iron sulfate—Trace. | |
| Agar | 15 |
| Distilled water to make 1 liter. | | for seven days when sporulation was complete. The spores from such an agar slant were used to inoculate 100 milliliters of seed medium in a 500-milliliter flask of the following sterile medium:

| | Grams |
|---|---|
| Glucose | 25 |
| Soy peptone | 10 |
| Corn steep liquor | 3 |
| Yeast extract | 3 |
| N–Z Amine A[1] | 2 |
| Ammonium sulfate | 3 |
| Magnesium sulfate | 0.2 |
| Sodium chloride | 0.1 |
| Hydrated iron sulfate | 0.02 |
| Hydrated manganese sulfate | 0.003 |
| Hydrated zinc sulfate | 0.004 |
| Dihydrogen potassium phosphate | 1.9 |
| Monohydrogen potassium phosphate | 1.1 |
| Adjusted to pH 7.2 before sterilizing. | |
| Water to make 1 liter. | |

[1] Enzymatic digest of casein.

which was incubated for 72 hours at 28 degrees centigrade on a rotary shaker at 250 r.p.m.

The culture thus obtained was used to inoculate the following sterile fermentation medium:

| | Grams |
|---|---|
| Kay-soy [1] | 30 |
| Ammonium sulfate | 5 |
| Glycerol | 40 |
| Calcium carbonate | 4 |
| Water to make 1 liter. | |
| (pH adjusted to 7.2 before sterilizing.) | |

[1] Fat extracted soybean meal, finely milled.

which was then incubated in a six-liter Erlenmeyer flask for five days on a rotary shaker, at 250 r.p.m., at thirty degrees centigrade. The yield was 960 micrograms of 6-amino-9-D-psicofuranosylpurine per milliliter of beer (Preparation 1).

The whole beer (Preparation 1) was adjusted to pH two and filtered. The clear filtrate was adjusted to pH ten and treated with one percent activated carbon. The carbon was separated from the beer and slurried in forty milliliters of anhydrous acetone. The acetone solution was separated from the carbon and distilled to an aqueous concentrate. The aqueous concentrate was filtered, neutralized to pH seven, and freeze-dried. The freeze-dried material was redissolved in water to the extent of 200 milligrams per milliliter at fifty degrees centigrade, and allowed to cool to room temperature to effect crystallization. Crystals (Preparation 2) melting at 198–200 degrees centigrade and containing about forty percent 6-amino-9-D-psicofuranosylpurine were thus obtained. The crystalline material (Preparation 2) was purified further by counter-current distribution, using a solvent system which consisted of butanol and water in the volume proportions of 1:1. To effect the purification and isolation of 6-amino-9-D-psicofuranosylpurine, Preparation 2 was distributed through 150 transfers in a Craig countercurrent distribution machine, and 6-amino-9-D-psicofuranisylpurine was isolated at a peak wherein $k=0.282–0.290$. One gram of Preparation 2 yielded 388 milligrams of pure (98 percent), crystalline 6-amino-9-D-psicofuranosylpurine, Preparation 3, having a melting point of 212–214 degrees centigrade and an optical rotation $[\alpha]_D^{25}$ in water of minus 46 degrees, in dimethylformamide of minus 68 degrees, in dimethylsulfoxide of minus 53.7 degrees.

*Analysis.*—Calculated for $C_{11}H_{15}N_5O_5$: C, 44.44; H, 508; N, 23.56; O, 26.91. Found: C, 44.25; H, 5.10; N, 23.74; O, 27.02.

It is to be understood that the invention is not to be limited to the exact details of operation, exact compounds shown, or exact example given and described herein, as obvious modifications and equivalents will be apparent to one skilled in the art, and the invention is therefore to be limited only by the scope of the appended claims.

We claim:
1. 6-amino-9-D-psicofuranosylpurine having the structural formula:

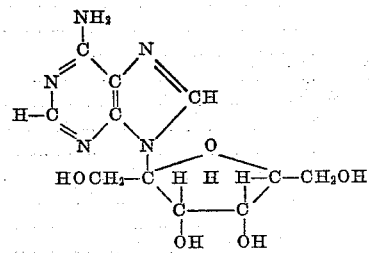

and an optical rotation in dimethylformamide of minus 68 degrees.

2. 6-amino-9-D-psicofuranosylpurine, according to claim 1, in its essentially pure crystalline form.

3. A composition of matter consisting of 6-amino-9-D-psicofuranosylpurine having the structural formula:

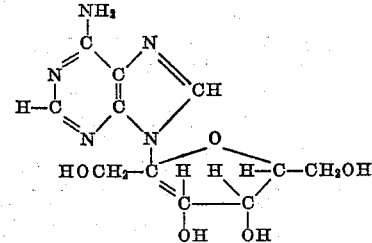

and characterized in its essentially pure crystalline form by optical rotation in dimethylformamide of minus 68 degrees.

References Cited in the file of this patent

Yuntsen: "Japan Journal of Antibiotics," Series A, December 1956, pp. 195–201.